United States Patent
Elias

(10) Patent No.: US 8,154,785 B2
(45) Date of Patent: Apr. 10, 2012

(54) ROTATING MIRRORED STILE FOR USAGE WITHIN A MIRROR LABYRINTH

(76) Inventor: Darrin Elias, Madison Heights, MI (US)

( * ) Notice: Subject to any disclaimer, the term of this patent is extended or adjusted under 35 U.S.C. 154(b) by 421 days.

(21) Appl. No.: 12/434,345

(22) Filed: May 1, 2009

(65) Prior Publication Data

US 2010/0277780 A1    Nov. 4, 2010

(51) Int. Cl.
  *G02B 26/08*    (2006.01)
(52) U.S. Cl. .................................... 359/216.1
(58) Field of Classification Search ...... 359/216.1–218.1
  See application file for complete search history.

(56) References Cited

U.S. PATENT DOCUMENTS

| | | |
|---|---|---|
| 4,640,266 A | 2/1987 | Levy |
| 4,720,184 A | 1/1988 | Watson |
| 4,782,614 A | 11/1988 | Beacom |
| 4,915,663 A | 4/1990 | Magers |
| 5,224,901 A | 7/1993 | Dahl et al. |
| 5,268,565 A * | 12/1993 | Katoh et al. ............. 235/462.31 |
| 6,705,740 B1 | 3/2004 | Weinreich |
| 6,709,339 B1 | 3/2004 | Hargabus |
| 2008/0205046 A1 | 8/2008 | Elias |

* cited by examiner

*Primary Examiner* — Euncha Cherry
(74) *Attorney, Agent, or Firm* — Patent Procurement Services

(57) ABSTRACT

A process for enhancing an illusion created by a mirror labyrinth containing a series of interreflective mirrors includes the placement of a rotatable mirrored stile rotating about a vertical axis within the mirror labyrinth to interact with the series of interreflective mirrors to enhance the illusion created by the mirror labyrinth. The rotatable mirrored stile preferably has a motor drive mechanism mountable to a floor or ceiling of a mirror maze. A polygonal post is mounted to the drive mechanism to define a rotational axis with the post defining from two to eight rotationally degenerate faces. At least one of the rotationally degenerate faces is mirrored.

17 Claims, 2 Drawing Sheets

ROTATING MIRRORED STILE FOR USAGE WITHIN A MIRROR LABYRINTH

FIELD OF THE INVENTION

The present invention in general relates to a rotating mirrored stile and in particular to a motorized rotating mirrored stile incorporated into a mirror labyrinth in order to enhance the visual complexity associated with navigating the mirror labyrinth.

BACKGROUND OF THE INVENTION

A mirror labyrinth represents a source of amusement associated with the visual disorientation created by multiple reflections between mirrors within the labyrinth. These multiple reflections not only create a perception of an infinite repeating space, but also can be constructed to obscure a portal within the labyrinth and a mirror surface. The visual trickery creates a sense of amusement; however, as one navigates a mirror labyrinth, visual perception becomes heightened to successfully navigate the labyrinth and distinguish between portals through which a user can pass from a mirrored surface. With experiential training, mirror labyrinth navigation becomes easier thereby diminishing the amusement value. Prior art attempts to increase the optical illusion associated with a mirror labyrinth have included mounting of clear glass or polymeric panes in lieu of a mirror or the inclusion of floor lighting as detailed in US 2008/0205046 A1. While these improvements have proved somewhat successful, the resultant mirror labyrinth remains static with respect to multiple reflections between mirrors.

Thus, there exists a need for a rotating mirrored stile to create dynamic interreflective mirrors. There further exists a need for a rotating mirrored stile to be motor driven so as to afford a dynamic mirror labyrinth.

SUMMARY OF THE INVENTION

A process for enhancing an illusion created by a mirror labyrinth containing a series of interreflective mirrors includes the placement of a rotatable mirrored stile rotating about a vertical axis within the mirror labyrinth to interact with the series of interreflective mirrors to enhance the illusion created by the mirror labyrinth. The rotatable mirrored stile preferably has a motor drive mechanism mountable to a floor or ceiling of a mirror maze. A polygonal post is mounted to the drive mechanism to define a rotational axis with the post defining from two to eight rotationally degenerate faces. At least one of the rotationally degenerate faces is mirrored.

DETAILED DESCRIPTION OF THE PREFERRED EMBODIMENTS

The present invention has utility in increasing visual illusion associated with a user navigating a mirror maze. Through the inclusion of a rotatable mirrored stile within a mirror labyrinth, the image interreflection associated with a mirror labyrinth is dynamic as the mirrored stile rotates. Preferably, the rotatable mirrored stile has a motor drive mechanism which during activation creates a dynamic interreflective illusion. The drive mechanism is optionally activated upon sensing a person in proximity to the rotatable mirrored stile.

Figure 1:
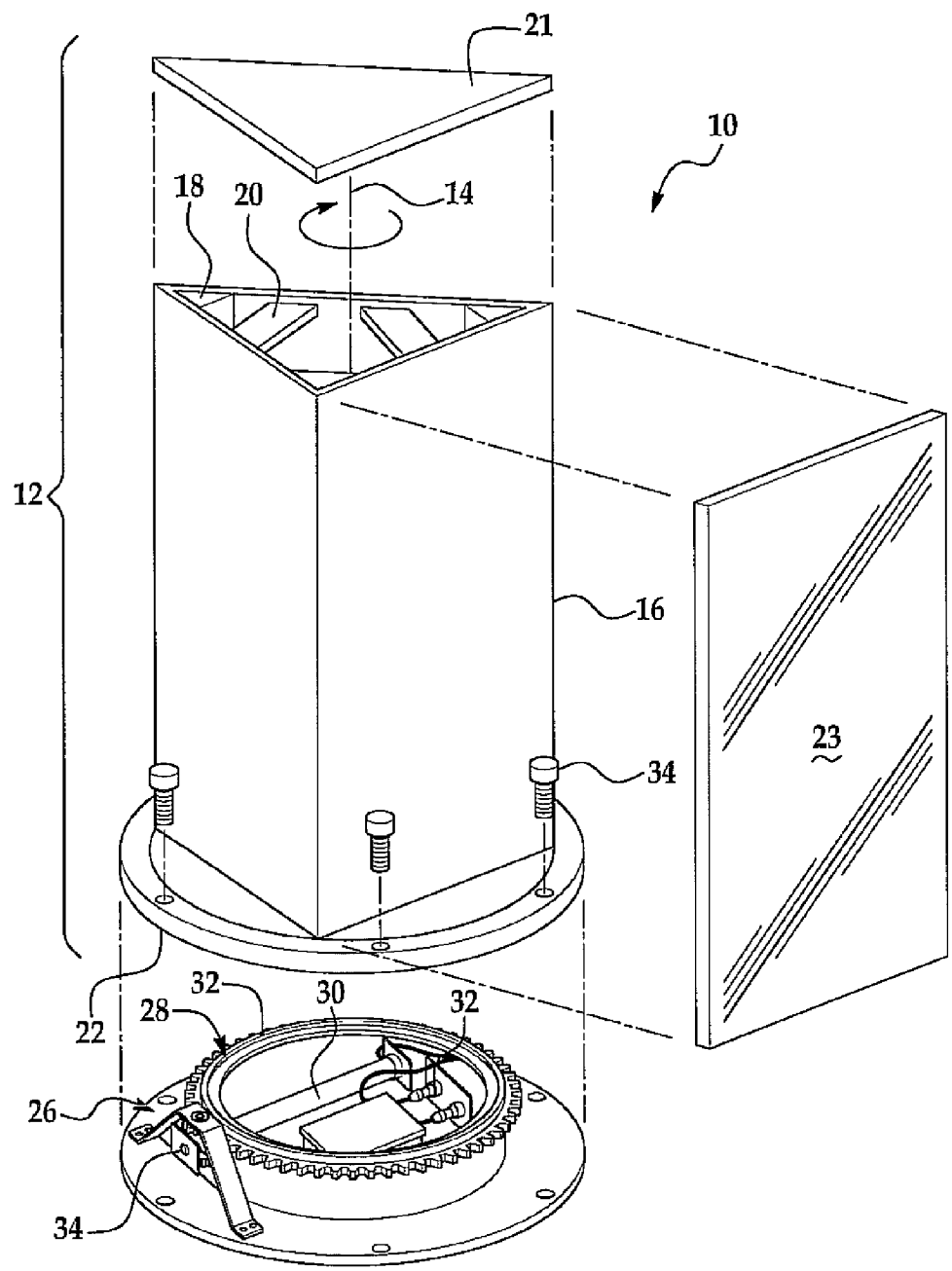
FIG. 1 is an exploded view of an inventive rotating mirrored stile.

The present invention will be further detailed with respect to the following nonlimiting figures. Referring now to FIG. 1, an inventive rotatable mirrored stile is shown generally at 10. The stile 10 includes a polygonal post 12 rotatable about a vertical axis 14. The post 12 has two to eight rotationally degenerate faces 16 relative to the rotational axis 14. In the instance when post 12 has two rotationally degenerate faces, the post is actually quadrangular in top view with two opposing faces with a long linear extent relative to the two intermediate adjoining faces. The polygonal post 12 depicted in FIG. 1 is triangular with three rotationally degenerate faces 16. Preferably, a triangular post is formed as approximately an equilateral triangle when viewed from above. It is appreciated that an equilateral triangle has a high degree of symmetry and therefore has a larger number of points of interreflective overlap with a surrounding mirror labyrinth upon rotation about the axis 14. A post 12 is formed by joining sheets of material such as sheet metal, plywood, or mirrored sheeting to form a polygonal structure. Corner braces 18 and spanning braces 20 are used to strengthen the polygonal structure to a desired degree of rigidity. A cover 21 optionally encloses the space within the polygonal structure. In instances when a face 16 is itself not mirrored, at least one such face 16 has a mirror 23 secured thereto. The post structure is secured to a base 22. The base 22 is mounted to a floor or ceiling within a mirror labyrinth by conventional means such that the base 22 is capable of rotation about axis 14. In the simplest embodiment, base 22 has a spindle extending along axis 14 that engages a floor or ceiling mounted bearing race.

In a preferred embodiment, the base 22 engages a motor drive mechanism 26 that is in turn mounted to a floor or ceiling within the mirror labyrinth. The motor drive mechanism 26 includes a diameter ball bearing swivel powered by an electric motor 30. The diameter ball bearing swivel preferably includes holes 32 adapted to receive a fastener 34 maintained in simultaneous contact between the base 22 and the swivel 28. Optionally, the motor drive mechanism 26 has limit switches 32 that are capable of stopping the drive mechanism 26 at any point of a clockwise or counterclockwise movement. A clutch assembly 34 is preferably provided that allows the post 12 to be disengaged from active movement by the drive mechanism 26 upon the post 12 contacting an external obstruction. A drive mechanism 26 operates in a number of modes including continuous rotation within a mirror labyrinth, activated upon an individual coming into proximity thereto through tripping an infrared, pressure or other type of switch; or through a mirror labyrinth operator selectively operating a radiofrequency remote control. It is appreciated that such controls include the ability to rotate either clockwise or counterclockwise.

Figure 2:
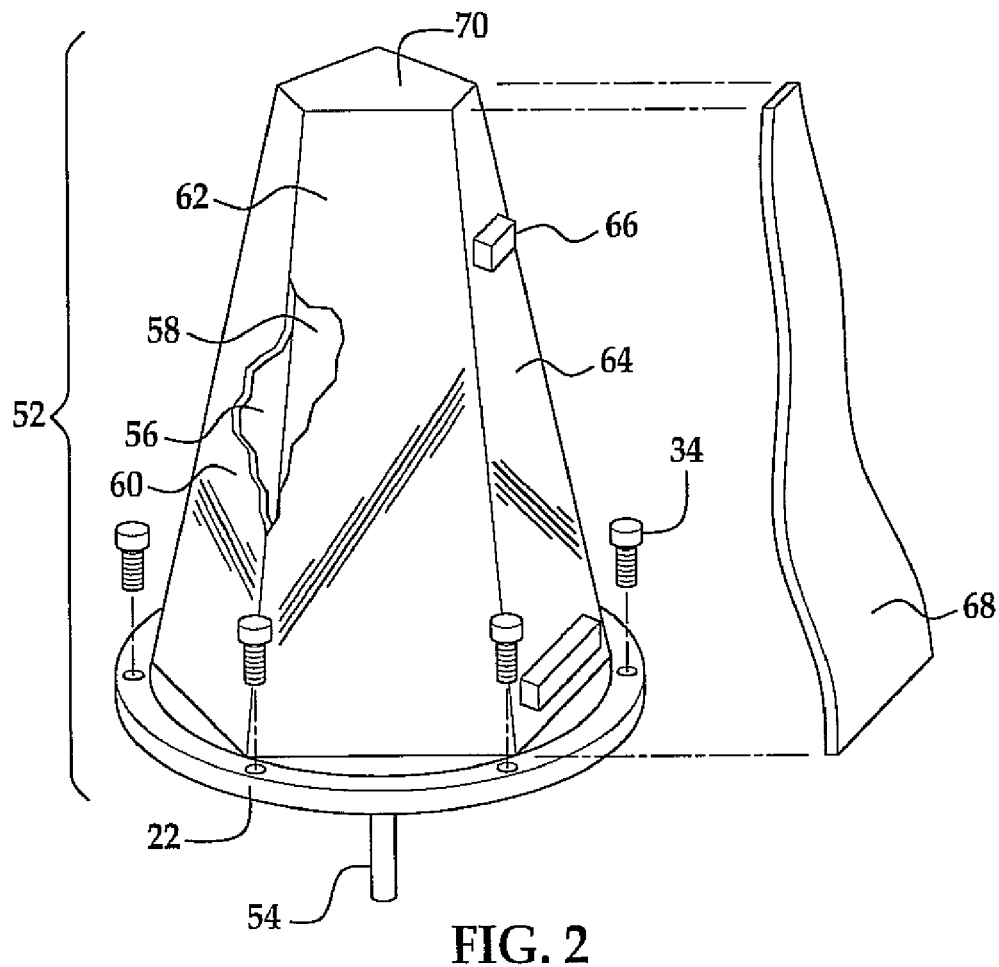
FIG. 2 is an exploded view of an alternate pentagonal mirrored post depicting a distorting, nonplanar mirror.

Referring now to FIG. 2, a pentagonal post 52 is shown that represents an alternate embodiment to post 12 depicted in FIG. 1. Post 52 has a base 22 adapted to engage fasteners 34 in instances when post 52 is coupled to a drive mechanism 26 or alternatively includes an axial spindle 54 in instances when the post 52 engages a ceiling or floor mounted bearing race (not shown). The post 52 depicts three faces as showing to the viewer. Planar faces 56 and 58 have mirrors 60 and 62 overlaying these faces, respectively. For visual clarity, the mirrors 60 and 62 are shown in partial cutaway view. Face 64 of the post 52 includes a mounting brace 66 adapted to engage the back side of a nonplanar distorting mirror 68. A cover 70 optionally secures to the opposing terminus of the polygonal structure relative to base 22.

Figure 3:
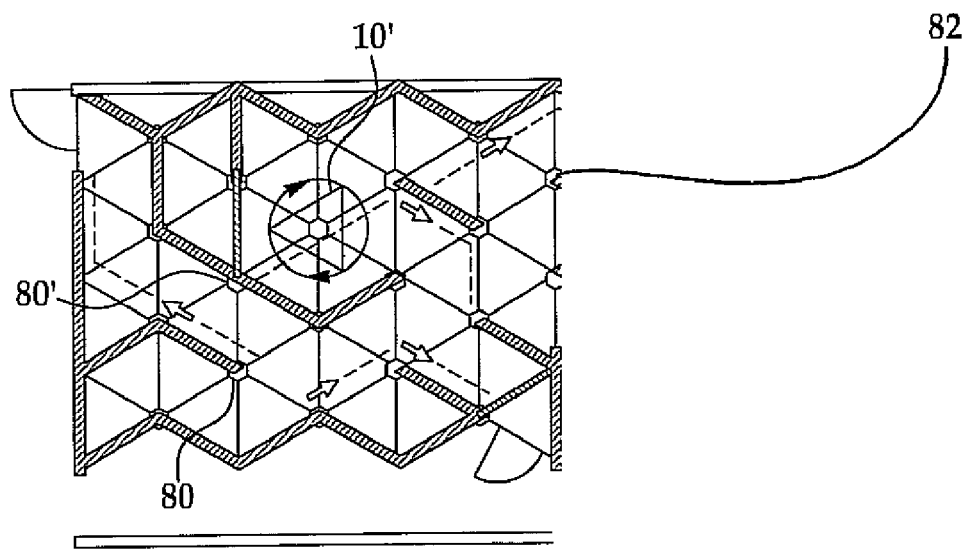
FIG. 3 is a top view of an exemplary mirror labyrinth including a mirrored stile of FIG. 1.

FIG. 3 depicts the placement of an inventive rotatable mirrored stile 10' within a mirror labyrinth. Preferably, the stile 10' is surrounded by the labyrinth. At least one sensor 80 is present within the mirror labyrinth and is of a type such as infrared, radiofrequency, or pressure switch such that a user coming into proximity to the rotatable mirrored stile 10' engages the drive mechanism 26 to cause the polygonal post to rotate about rotational axis 14. Optionally, an additional sensor 82 of a like or dissimilar type relative to sensor 80 is also placed within the mirror labyrinth to provide a separate control switch for changing the operation of the drive mechanism 26. Changes in operation of the drive mechanism illustratively include activation/inactivation, change of drive mechanism directionality, or change in drive mechanism speed. Optionally, a second rotatable mirrored stile is deployed within a mirror labyrinth. The second rotatable mirrored stile is appreciated to be like the rotatable mirrored stile 10' or vary in terms of the number of polygonal faces, the number of mirrored polygonal faces or the inclusion or exclusion of a nonplanar distorting mirror mounted thereto. The second rotatable mirrored stile is optionally continually operated or operated by a proximity switch 80' or triggered by one of the sensors 80 or 82.

Patent documents and publications mentioned in the specification are indicative of the levels of those spilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for enhancing an illusion created by a mirror labyrinth composed of a series of interreflective mirrors comprising:
   placing a rotatable mirrored stile rotating about a vertical axis within the mirror labyrinth to interact with the series of interreflective mirrors to enhance the illusion created by the mirror labyrinth, said mirror labyrinth forming a mirror maze that is navigated by a user or person.

2. The process of claim 1 further comprising rotating said rotatable mirrored stile with an electric powered drive mechanism.

3. The process of claim 2 wherein the rotating of said rotatable mirrored stile is in a clockwise or counterclockwise direction.

4. The process of claim 2 further comprising activating said drive mechanism upon sensing a person in proximity to said rotatable mirrored stile.

5. The process of claim 2 further comprising disengaging said drive mechanism from said rotatable mirrored stile upon said rotatable mirrored stile contacting an external obstruction.

6. The process of claim 1 further comprising deploying a second rotatable mirrored stile rotating about a second stile vertical axis.

7. The process of claim 6 further comprising rotating said second rotatable mirrored stile with a second electrically powered drive mechanism.

8. The process of claim 1 wherein said rotatable mirrored stile is rotatably mounted to a floor of the mirror labyrinth.

9. A rotatable mirrored stile comprising:
   an electrically driven drive mechanism mountable to a floor or ceiling;
   a polygonal post mounted to said drive mechanism to define a rotational axis, said post defining two to eight rotationally degenerate faces; and
   at least one of said two to eight rotationally degenerate faces being mirrored.

10. The stile of claim 9 wherein said drive mechanism further comprises a clutch assembly to disengage said post from said drive assembly upon said post contacting an external obstruction.

11. The stile of claim 9 wherein said drive mechanism is mounted to said floor within a mirror labyrinth.

12. The stile of claim 9 wherein said two to eight rotationally degenerate faces are parallel and planar.

13. The stile of claim 12 wherein all of said rotationally degenerate faces are mirrored.

14. The stile of claim 9 wherein said post has at least one rotationally nondegenerate, nonplanar mirrored face.

15. A mirror labyrinth comprising:
   a plurality of fixed position interreflective mirrors; and
   a rotatable mirrored stile comprising:
      an electrically driven drive mechanism mountable to a floor or ceiling;
      a polygonal post mounted to said drive mechanism to define a rotational axis, said post defining two to eight rotationally degenerate faces;
      at least one of said two to eight rotationally degenerate faces being mirrored; and
   wherein said mirror labyrinth forms a mirror maze that is navigated by a user or person.

16. The mirror labyrinth of claim 15 further comprising a sensor activating said drive assembly upon a person being in proximity to said sensor.

17. The mirror labyrinth of claim 15 further comprising a second rotatable mirrored stile creating interreflections with said rotatable mirrored stile in certain orientations.

* * * * *